(12) United States Patent
Lee et al.

(10) Patent No.: US 10,991,224 B2
(45) Date of Patent: Apr. 27, 2021

(54) FIRE DETECTION SYSTEM BASED ON ARTIFICIAL INTELLIGENCE AND FIRE DETECTION METHOD BASED ON ARTIFICIAL INTELLIGENCE

(71) Applicant: Chang Sung Ace Co., Ltd., Seongnam-si (KR)

(72) Inventors: Yeu Yong Lee, Seongnam-si (KR); Won Il Lee, Seongnam-si (KR)

(73) Assignee: CHANG SUNG ACE CO., LTD., Seongnam-si (KR)

( * ) Notice: Subject to any disclaimer, the term of this patent is extended or adjusted under 35 U.S.C. 154(b) by 0 days.

(21) Appl. No.: 16/893,592

(22) Filed: Jun. 5, 2020

(65) Prior Publication Data
US 2020/0388128 A1 Dec. 10, 2020

(30) Foreign Application Priority Data
Jun. 7, 2019 (KR) .................. 10-2019-0067243

(51) Int. Cl.
| | |
|---|---|
| *G08B 17/12* | (2006.01) |
| *G06T 7/194* | (2017.01) |
| *G06T 7/246* | (2017.01) |
| *G06K 9/00* | (2006.01) |
| *G06K 9/32* | (2006.01) |
| *G06K 9/46* | (2006.01) |

(52) U.S. Cl.
CPC ....... *G08B 17/125* (2013.01); *G06K 9/00771* (2013.01); *G06K 9/3241* (2013.01); *G06K 9/4652* (2013.01); *G06K 9/4661* (2013.01); *G06T 7/194* (2017.01); *G06T 7/248* (2017.01); *G06T 2207/30232* (2013.01)

(58) Field of Classification Search
CPC .................................................. G08B 17/125
USPC ......................................................... 348/143
See application file for complete search history.

(56) References Cited

U.S. PATENT DOCUMENTS

| | | | | |
|---|---|---|---|---|
| 2008/0252723 A1* | 10/2008 | Park | ........................ | G06T 7/536 |
| | | | | 348/143 |
| 2018/0239948 A1* | 8/2018 | Rutschman | ............... | G06T 7/20 |

* cited by examiner

*Primary Examiner* — Yulin Sun
(74) *Attorney, Agent, or Firm* — Lex IP Meister, PLLC (57) ABSTRACT

The present disclosure relates to a fire detection system based on AI and a fire detection method based on Ai, which detects fire by using deep learning. The fire detection system includes a camera part generating video images, an object extraction part extracting a motion object from the video images, a video image conversion part generating a first background removal image, an image division part dividing the first background removal image with a plurality of division lines, and an analyzing part generating an abnormal signal and a normal signal.

10 Claims, 9 Drawing Sheets

>Setting time

Fig.9b

FIRE DETECTION SYSTEM BASED ON ARTIFICIAL INTELLIGENCE AND FIRE DETECTION METHOD BASED ON ARTIFICIAL INTELLIGENCE

CROSS REFERENCE TO RELATED APPLICATION

The present application claims priority to Korean Patent Application No. 10-2019-0067243, filed Jun. 7, 2019, the entire contents of which is incorporated herein for all purposes by this reference.

BACKGROUND OF THE INVENTION

Field of the Invention

The present disclosure relates generally to a fire detection system based on artificial intelligence.

Description of the Related Art

The convergence of information and communication technologies, such as artificial intelligence (AI), deep learning, and Internet of Things, which drive the $4^{th}$ industrial revolution, and video security has become intense. In the past, closed circuit television (CCTV) was only used as a crime prevention means. Recently, CCTV has expanded into a technology that can prevent accidents by being integrated with AI technology.

Accordingly, the technique attracting attention is a fire detection system. When a preset flame is detected, the fire detection system provides the detected flame to a monitoring agent so that efficient monitoring may proceed.

A current fire detection system proceeds by the process of converting a video taken by CCTV into a video packet, decoding the converted video packet into a video frame, and detecting an abnormal object from the decoded video frame. That is, the current fire detection system decodes received data to generate a video and analyzes the video in order to accurately detect a flame.

The fire detection system as described above uses a lot of resources to detect an object. However, despite the use of a large number of resources, the system has low reliability in fire detection and does not determine characteristics of flame. In addition, the system does not detect fire through human motion, and moreover, does not detect an arsonist who has caused fire.

Documents of Related Art (Patent Document 1) Korean Patent No. 10-1328246 (published date: Nov. 14, 2013).

SUMMARY OF THE INVENTION

Accordingly, the present disclosure has been made keeping in mind the above problems occurring in the related art, and the present disclosure is intended to propose a system of detecting an object by a camera, monitoring a location where the object is detected by zooming in, dividing a video image in which the object is detected into a plurality of spaces, and accurately determining a feature of the object on the video image thereby solving a part of the above-described problems. In addition, the present disclosure is intended to propose a system of accurately detecting a motion of the object by enlarging the object after detection of the object to extract a feature from motion change of the object thereby solving another part of the above-described problems. Further, the present disclosure is intended to propose a system of accurately detecting flame to prevent fire accident from occurring through the detected flame thereby solving the other part of the above-described problems.

The problems to be solved of the present disclosure are not limited to the above-mentioned problems, and other technical problems not mentioned will be clearly understood by those skilled in the art by the following description.

In order to achieve the above objectives, according to one aspect of the present disclosure, there is provided a fire detection system based on AI. The fire detection system includes: a camera part monitoring a predetermined area and generating a first video image and a second video image according to monitoring time taken; an object extraction part including a plurality of preset reference objects, receiving the first and second video images from the camera part to extract a first motion object between the first and second video images, and configured to compare the first motion object with the reference objects and to generate a detection signal when the first motion object is matched with the reference objects by greater than or equal to a reference value, and to generate a non-detection signal when the first motion object is matched with the reference objects by smaller than the reference value; a video image conversion part receiving the first and second video images from the object extraction part, and when receiving the detection signal from the object extraction part, comparing the first video image and the second video image with each other and removing same parts therein to generate a first background removal image; an image division part dividing the first background removal image with a plurality of division lines, moving the division lines to the first motion object, and calculating a size of the first motion object; and an analyzing part configured to generate an abnormal signal when the size of the first motion object is greater than or equal to a preset size and to generate a normal signal when the size of the first motion object is smaller than the preset size.

The object extraction part may set the first video image as a reference video image when the first motion object is extracted, extract a second motion object by comparing the reference video image with a third video image generated in the camera part after the second video image is generated, and add and subtract the second motion object to or from the first motion object to match the second motion object with the reference objects.

The video image conversion part may compare the first background removal image, which may be generated by comparing the first video image and the second video image, and a second background removal image, which may be generated by comparing the first video image and the third video image, to extract a part where a difference may exist as a moving object image.

The video image conversion part may be configured to generate a first color extraction image by removing same color between the first video image and the second video image or to generate a second color extraction image by removing same color between the first video image and the third video image.

The fire detection system may include an image combination part configured to combine the moving object image with the first color extraction image or the second color extraction image to detect the first motion object or the second motion object, respectively.

The analyzing part may calculate a brightness value of a plurality of divided spaces and add a plurality of spaces that have brightness values greater than or equal to a reference brightness value to be generated into a single space.

In order to achieve the above objectives, according to another aspect of the present disclosure, there is provided a fire detection method based on artificial intelligence. The fire detection method may include the steps of: (A) monitoring a predetermined area and generating a first video image and a second video image according to monitoring time taken by a camera part; (B) receiving, by an object extraction part having a plurality of preset reference objects, the first video image and the second video image from the camera part to extract a first motion object between the first video image and the second video image, and comparing the first motion object with the reference objects to generate a detection signal when the first motion object is matched with the reference objects by greater than or equal to a reference value, and to generate a non-detection signal when the first motion object is matched with the reference objects by less than the reference value; (C) receiving, by a video image conversion part, the first video image and the second video image from the object extraction part, and comparing the first video image and the second video image and removing a same part therefrom to generate a first background removal image when the detection signal is transmitted from the object extraction part; (D) dividing, by an image division part, the first background removal image with a plurality of division lines, moving the division lines to the first motion object, and calculating a size of the first motion object; (E) generating an abnormal signal when the size of the first motion object is greater than or equal to a preset size, and generating a normal signal when the size of the first motion object is smaller than the preset size.

The step (B) further may include: setting the first video image as a reference video image when the first motion object is extracted by the object extraction part, extracting a second motion object by comparing the reference video image with a third video image generated in the camera part after the second video image is generated, and adding and subtracting the second motion object to and from the first motion object to match the second motion object with the reference objects.

The step (C) further may include: comparing, by the video image conversion part, the first background removal image, which is generated by comparing the first video image and the second video image, and a second background removal image, which is generated by comparing the first video image and the third video image, to extract a part where a difference exists as a moving object image.

The step (C) further may include: generating, by the video image conversion part, a first color extraction image by removing same color between the first video image and the second video image and generating a second color extraction image by removing same color between the first video image and the third video image.

As described above, the present disclosure can accurately detect a preset object, process the detected object, and accurately determine a feature of the object on the basis of AI. In addition, the present disclosure can detect the object, enlarge the detected object to accurately detect a motion of the object, and extract feature of the object from motion change of the object.

Further, the present disclosure can detect a feature from the motion change to detect information on fire occurrence, starting of fire, and an arsonist. The present disclosure can convert the detected signal into an alarm signal to allow workers to quickly recognize fire.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The above and other objects, features, and advantages of the present disclosure will be more clearly understood from embodiments described below in detail when taken in conjunction with the accompanying drawings. However, embodiments of the present invention are presented to make complete the disclosure and help those who are ordinarily skilled in the art best understand the invention. Various changes to the following embodiments are possible and the scope of the present disclosure is not limited to the following embodiments.

The scope of the present disclosure is defined by the accompanying claims and description supporting the claims. In addition, the same reference numerals will be used throughout the drawings and the description to refer to the same or like elements or parts. In this specification, a first video image means an image generated before a second video image and a third video image, and the second video image means an image generated after the generation of the first video image and before the generation of the third video image. The third video image means an image generated after the generations of the first and second video images.

Accordingly, a camera part may generate video images in the order of the first video image, the second video image, and the third video image. In addition, all the descriptions for detecting fire throughout the specification can be applied to a first detection system based on artificial intelligence (AI) and a first detection method based on AI.

Hereinbelow, referring to FIGS. 1 to 10, a first detection system based on AI and a first detection method based on AI according to an embodiment of the present disclosure will be described in detail. However, in order to make the descriptions of the present disclosure concise and clear, the first detection system based on AI will be described in detail first, and then the first detection method based on AI will be described.

Figure 1:
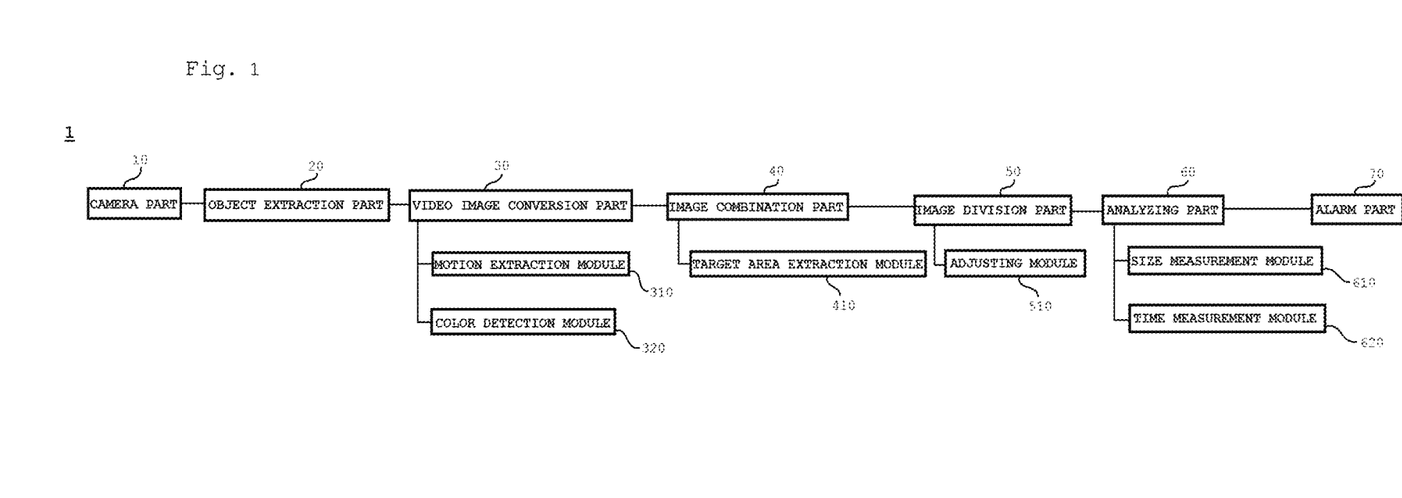
FIG. 1 is a block diagram of a fire detection system based on AI according to an embodiment of the present disclosure.
Figure 2A:
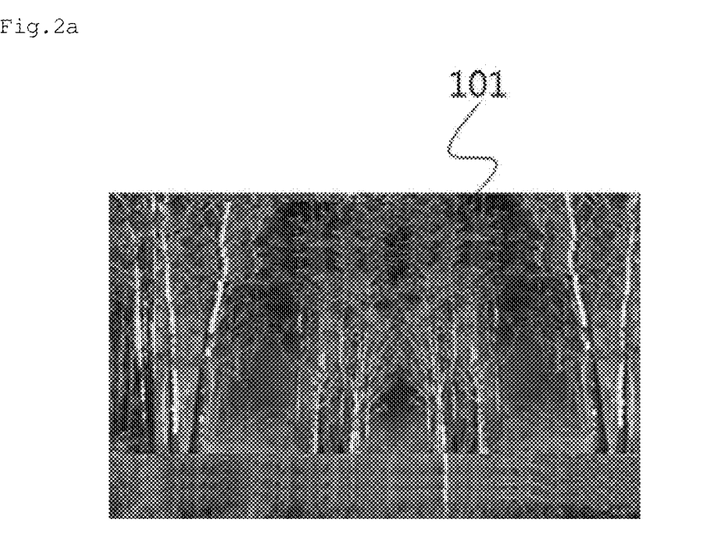
FIGS. 2A and 2B are video images taken by a camera part in FIG. 1.
Figure 2B:
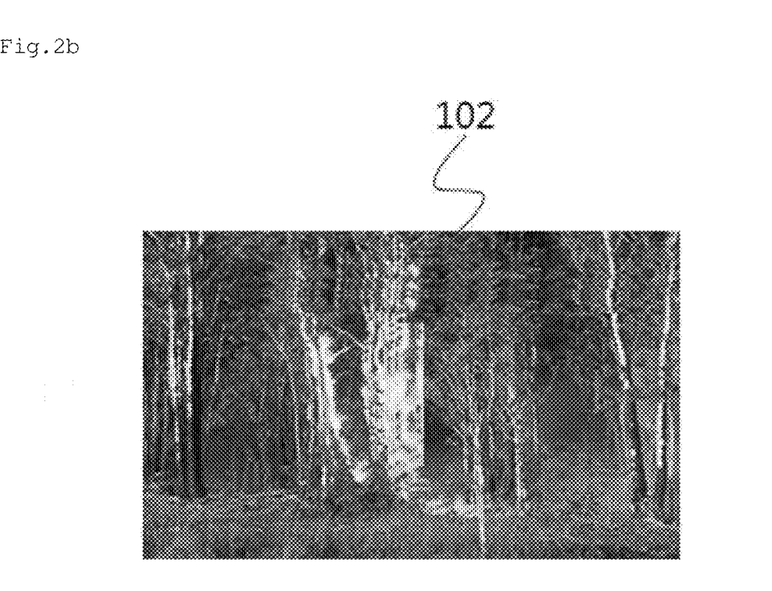
Figure 3:
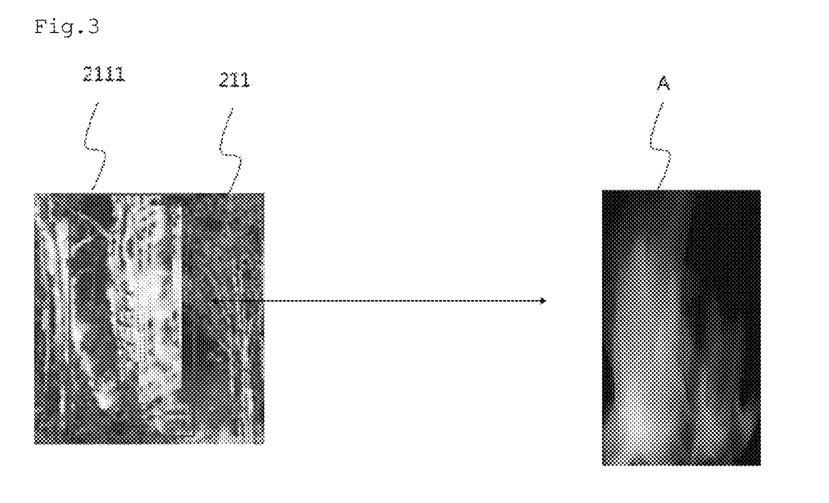
FIG. 3 is a video image processed by a motion extraction module in a video image conversion part in FIG. 1.
Figure 6A:
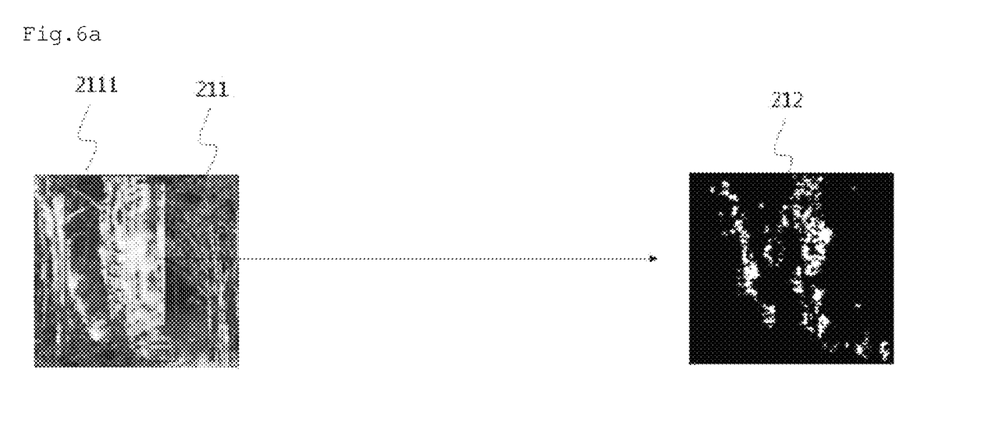
FIGS. 6A and 6B are video images processed by the video image conversion part in FIG. 1.
Figure 6B:
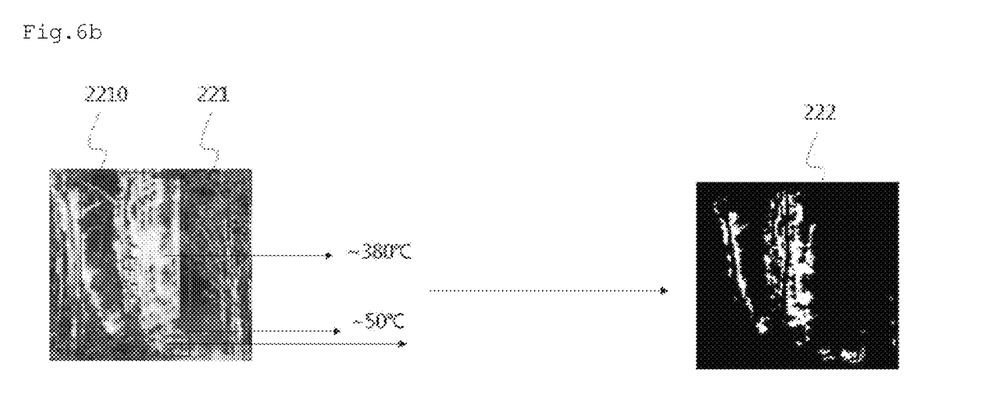
Figure 7:
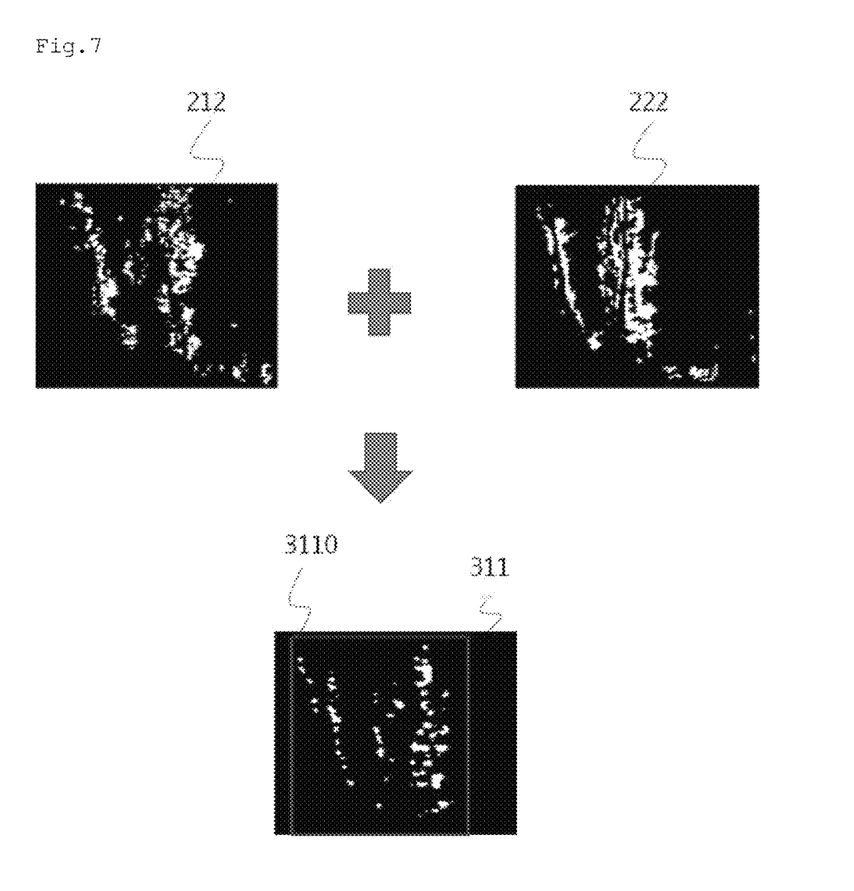
FIG. 7 is a video image processed by an image combination part in FIG. 1.
Figure 8A:
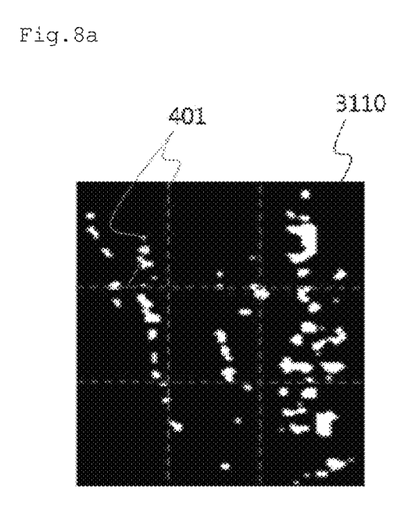
FIGS. 8A and 8B are video images processed by an image division part in FIG. 1.
Figure 8B:
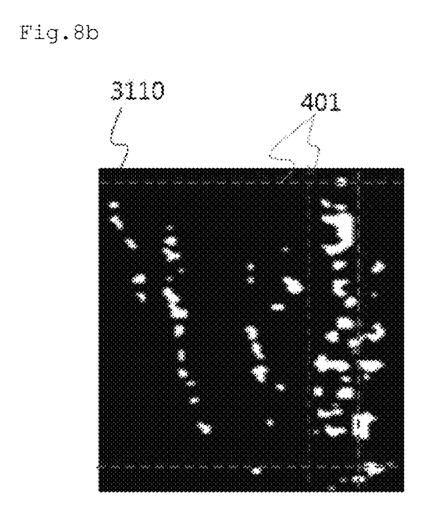
Figure 9A:
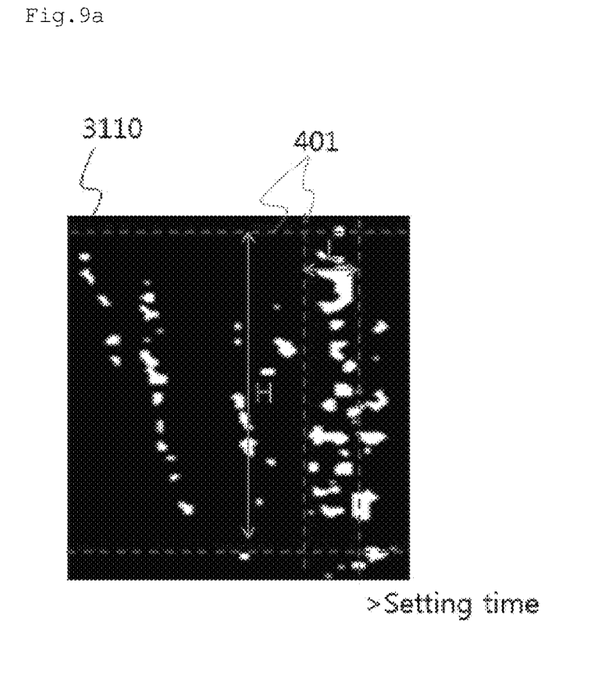
FIGS. 9A and 9B are video images processed by an analyzing part in FIG. 1.
Figure 9B:
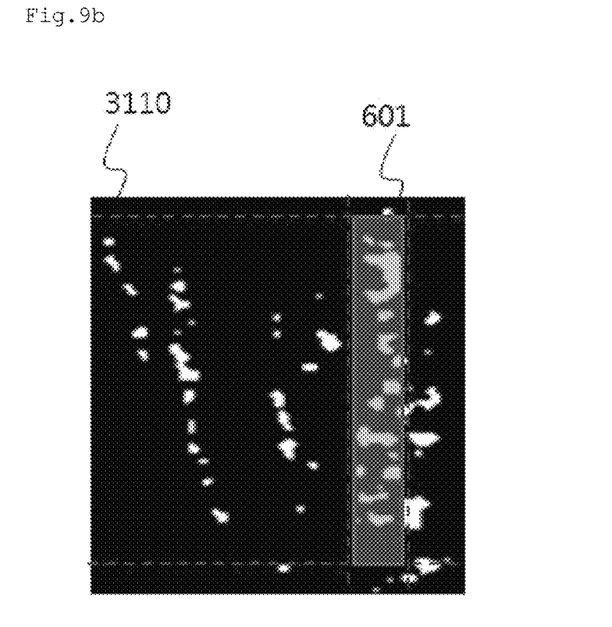

FIG. 1 is a block diagram of the fire detection system based on AI according to an embodiment of the present disclosure, FIGS. 2A and 2B are video images taken by a camera part in FIG. 1, FIG. 3 is a video image processed by a motion extraction module in a video image conversion part in FIG. 1, and FIGS. 4A, 4B, and 4C are video images of human lip shapes detected by an object extraction part in FIG. 1. FIG. 5 is a video image of a person being forcibly dragged which is detected by the object extraction part in FIG. 1 and FIGS. 6A and 6B are video images processed by the video image conversion part in FIG. 1. FIG. 7 is a video image processed by an image combination part in FIG. 1 and FIGS. 8A and 8B are video images processed by an image division part in FIG. 1. FIGS. 9A and 9B are video images processed by an analyzing part in FIG. 1.

Hereinafter, referring to FIGS. 1 to 9, the fire detection system based on AI 1 of the present disclosure is configured to accumulate data on the basis of AI, to learn accumulated data, and then to detect characteristics of newly introduced data from the accumulate data. The fire detection system based on AI 1 may ensure high reliability in flame detection. The fire detection system based on AI 1 may be configured to extract information on the temperature, size, and direction of the detected flame to determine causes of the flame. The fire detection system based on AI 1 may be configured to detect objects, such as human and human lips as well as the flame, and then to enlarge the objects to accurately detect motions of the object, and to extract information from the detected motions.

Accordingly, the fire detection system based on AI 1 may accurately detect whether fire has occurred, and moreover, accurately detect a person who causes the fire. Additionally, the fire detection system based on AI 1 may transmit information on the detected fire to an alarm part 70 to generate an alarm so that a worker around the fire can quickly avoid for flame.

The fire detection system based on AI 1 having the above characteristics includes: the camera part 10, the object extraction part 20, the video image conversion part 30, the image combination part 40, the image division part 50, an analyzing part 60, and the alarm part 70.

The camera part 10 monitors a predetermined area, such as a building and a forest, from a location where a user installs the camera part 10. For example, the camera part 10 may be a closed circuit television (CCTV). The camera part 10 monitors the predetermined area with a predetermined time difference and generates a first video image and a second video image according to the time taken. The camera part 10 may monitors the predetermined area to generate the first video image 101, as shown in FIG. 2A, and the second video image 102 after the first video image 101, as shown in FIG. 2B. The camera part 10 sequentially transmits the video images to the object extraction part 20 that is connected through network.

The object extraction part 20 receives each video image as each video data, and then extracts a motion object corresponding to a reference object. More particularly, the object extraction part 20 has a plurality of preset reference objects. The reference object may be flame, human, and human lips, etc. The object extraction part 20 having the reference objects receives the first video image 101 and the second video image 102 from the camera part 10 and extracts a first motion object 2111 from a difference between the first video image 101 and the second video image 102, and compares the extracted first motion object 2111 with the reference objects A. The object extraction part 20 generates a detection signal when the first motion object 2111 matches with the reference objects A by more than a reference value. The object extraction part 20 generates a non-detection signal when the first motion object 2111 matches with the reference objects A by smaller than the reference value. In addition, the object extraction part 20 sets the first video image 101 as a reference video image when the first motion object 2111 is extracted between the first video image 101 and the second video image 102. Whereafter, a second motion object is extracted by comparing the reference video image and a third video image generated by the camera part 10 after the second video image. Then, the second motion object may match with the reference objects A by being added and subtracted to the first motion object 2111. The object extraction part 20 may generate the detection signal, when flame is set as the reference objects A and a shape in which the first motion object and the second motion object are combined matches with the reference objects by more than 80% according to a motion and shape of the flame. However, when the combined image matches with the reference objects by smaller than 80%, the object extraction part 20 may generate the non-detection signal.

Figure 4A:
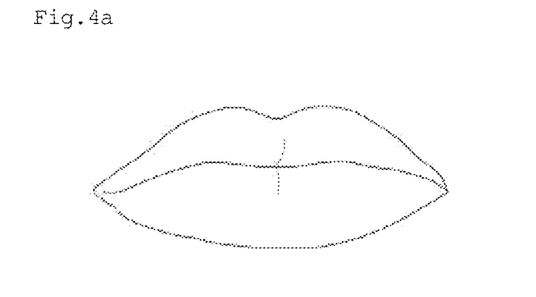
FIGS. 4A, 4B, and 4C are video images of human lip shapes detected by an object extraction part in FIG. 1.
Figure 4B:
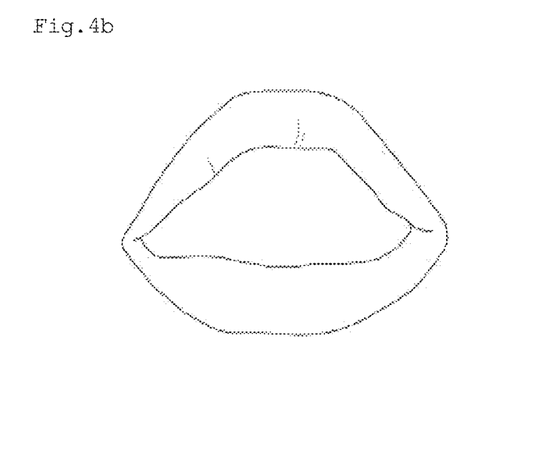
Figure 4C:
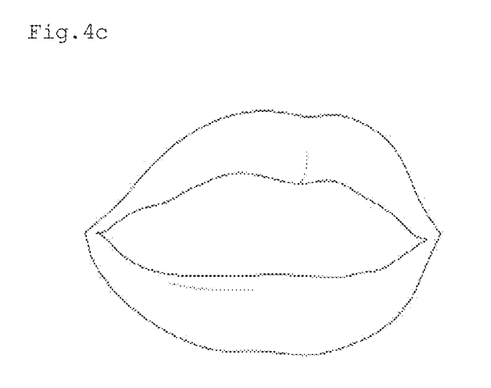
Figure 5:
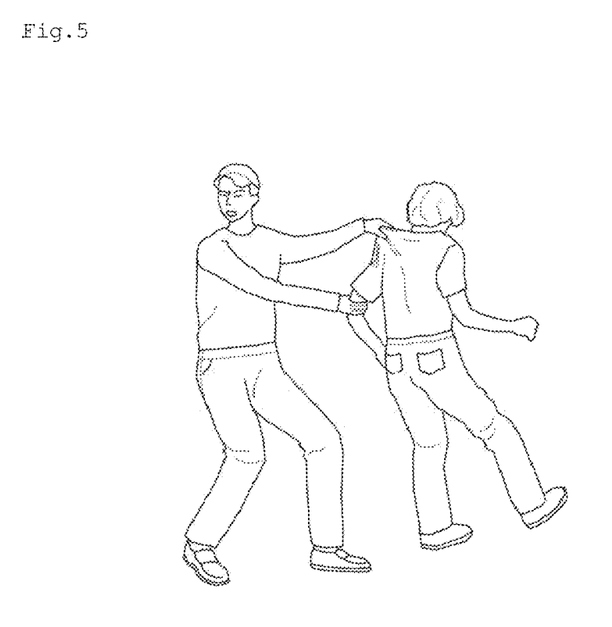
FIG. 5 is a video image of a person being forcibly dragged which is detected by the object extraction part in FIG. 1.

As shown in FIGS. 4 and 5, in case that human and human lips are set as the reference objects, when shapes of the first motion object and the second motion object match with each other by more than 80% on the basis of motions of shapes of the human and human lips, the object extraction part 20 generates the detection signal. However, when the shapes of the first motion object and the second motion object match with each other by smaller than 80%, the object extraction part 20 may generate the non-detection signal. For example, as shown in FIG. 4, when a shape of human lips that say "Help" is set as the reference object, the object extraction part 20 may extract a motion of human lips as the first motion object and to allow the first motion object and the reference objects to match with each other to calculate a matching degree. The object extraction part 20 may generate the detection signal corresponding to a calculated value of the matching degree. As shown in FIG. 5, when a shape of a person being forcibly dragged is set as the reference objects, the object extraction part 20 may extract a motion of a person being forcibly dragged as the first motion object and allow the first motion object and the reference objects to match with each other to calculate the matching degree. The object extraction part 20 may generate the detection signal corresponding to a calculated value of the matching degree.

The object extraction part 20 may generate the detection signal and the non-detection signal through motions of flame, human, human lips, etc., and transmit the signals to the video image conversion part 30. Hereinafter, as an example in the case where flame is set as the reference object by the object extraction part 20, features of components constituting the fire detection system based on AI 1 will be described.

The video image conversion part 30 receives the first video image 101 and the second video image 102 from the camera part 10 and receives the detection signal from the object extraction part 20. The video image conversion part 30 includes a motion extraction module 310 and a color detection module 320.

The video image conversion part 30 enlarges the first motion object 2111 when receives the detection signal through the motion extraction module 310, as shown in FIG. 3. Then, as shown in FIG. 6, the video image conversion part 30 extracts the color of the second video image 102 around a location where the first motion object 2111 is detected. More particularly, when the detection signal is transmitted to the video image conversion part 30, the video image conversion part 30 enlarges the location where the first motion object 2111 is detected in the first video image 101 and at the second video image 102, respectively. Then, the video image conversion part 30 compares enlarged locations in the first video image 101 and the second video image 102 to each other. Whereby, the video image conversion part 30 removes the same parts between the first video image 101 and the second video image 102 while keeping different parts to generate a first background removal image 212. Further, the video image conversion part 30 may remove the same color between the first video image 101 and the second video image 102 through the color detection module 320 to generate a first color extraction image 222. In addition, as shown in FIG. 6B, the video image conversion part 30 may extract the temperature from blue, cyan, pale yellow, light orange, deep orange, orange, etc. shown in the first video image and the second video image. The video image conversion part 30 may remove the same parts while comparing the first video image and the third video image to generate a second background removal image including parts where only a difference exists. The video image conversion part 30 may generate a second color extraction image while removing the same color between the first video image and the third video image.

The video image conversion part 30 transmits the first background removal image 212, the second background removal image, the first color extraction image 222, and the second color extraction image to the image combination part 40 or the image division part 50. The video image conversion part 30 generates the second background removal image from the first video image and the third video image. In addition, the video image conversion part 30 may compare the first background removal image 212 and the second background removal image to extract a part where a difference exists as a moving object image.

As shown in FIG. 7, the image combination part 40 combines the first background removal image 212, that is, the moving object image with the first color extraction image 222 or the second color extraction image. The image combination part 40 includes a target area extraction module 410 that extracts an object from the combined image. Thus, it is possible to smoothly extract a target object 3110 that is an overlap part in the first color extraction image and the second color extraction image being combined.

As shown in FIG. 8A, the image division part 50 may divide a single area extracted from the image combination part 40 or the first background removal image 212 transmitted from the video image conversion part 30 by a plurality of division lines 401. For example, the image division part 50 may divide the extracted single area or the first background removal image 212 into nine spaces through two vertical division lines and two horizontal division lines in addition to a division module. In addition, as shown in FIG. 8B, the image division part 50 includes an adjusting module 510 to move the plurality of division lines to a motion object that is obtained by adding various motion objects including the first motion object to calculate a size of the motion object. Then, the image division part 50 transmits a calculation value to the analyzing part 60.

The analyzing part 60 compares sizes of the first motion object and the motion object obtained by adding and subtracting another motion object to or from the first motion object with a preset size. The analyzing part 60 may include a size measurement module 610 and a time measurement module 620.

As shown in FIG. 9A, the analyzing part 60 compares the size of the target object 3110 extracted by the image combination part 40 with the preset size. As shown in FIG. 9B, when the size of the target object 3110 extracted by the image combination part 40 is larger than the preset size, the analyzing part 60 may generate an abnormal signal through the size measurement module 610. In addition, when time when the motion object was located is larger than preset time, the analyzing part 60 may generate the abnormal signal through the time measurement module 620. On the contrary, when the size of the first motion object is smaller than the preset size, the analyzing part 60 may generate a normal signal. In addition, the analyzing part 60 calculates a brightness value of a plurality of divided spaces. The analyzing part 60 adds a plurality of spaces having brightness values greater than or equal to a reference brightness value to be generated into a single space 601. Then, analyzing part 60 compares a size of the space 601 and the preset size. When the size of the space 601 is larger than the preset size, the analyzing part 60 generates the abnormal signal.

Through the features of the components as described above, the fire detection system based on AI 1 can accurately detect flame and ensure high reliability in flame detection. Further, the fire detection system based on AI can check the detected flame by various ways and can analyze the size, temperature, and motion of the flame and may find causes of flame. Moreover, after detection of object such as flame, human, etc., the fire detection system based on AI can accurately detect a motion of the object by enlarging the object and accurately determine causes of fire to detect a person who causes the fire.

Hereinafter, the fire detection method based on AI according to an embodiment of the present disclosure will be described in detail on the basis of the above description of the fire detection system based on AI 1. The fire detection method based on AI will be described on the basis of a flowchart in FIG. 10.

Figure 10:
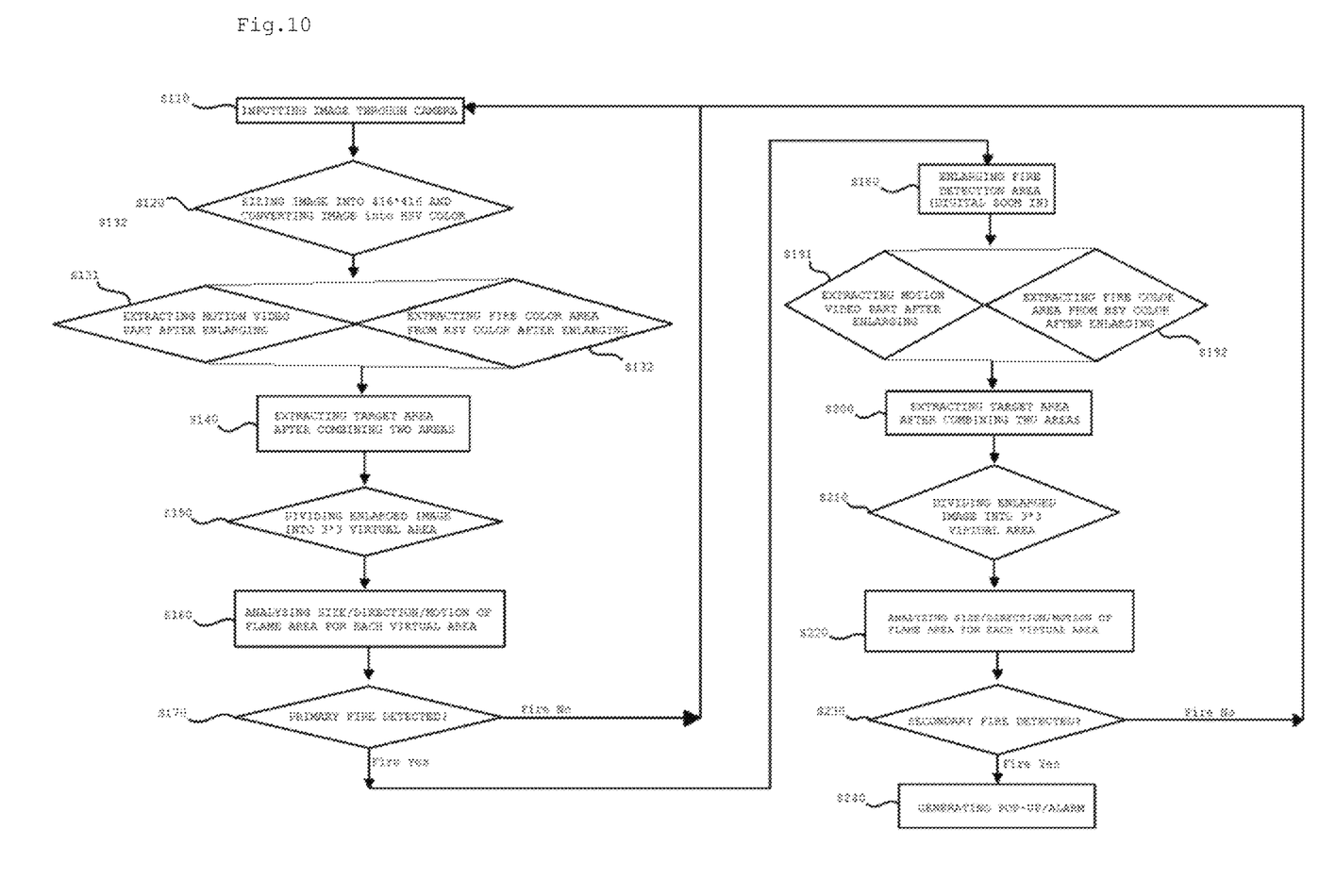
FIG. 10 is a flowchart of a fire detection method based on AI according to an embodiment of the present disclosure.

FIG. 10 is the flowchart of the fire detection method based on AI according to the embodiment of the present disclosure.

Referring to FIG. 10, the fire detection method based on AI includes the steps of: (A) generating the first video image and the second video image; (B) extracting a motion object to match with the reference objects; (C) generating the first background removal image; (D) dividing the first background removal image; and (E) analyzing the divided first background removal image.

Hereinafter, in addition to each step of the fire detection method based on AI, steps to enable the purpose of the fire detection method based on AI to be achieved more smoothly will be described in detail.

The fire detection method based on AI is started by a step in which the camera part 10 monitors the predetermined area and generates the first video image 101 and the second video image 102 according to the monitoring time (S110). Then, the fire detection method proceeds to a step in which the object extraction part 20 includes the plurality of preset reference objects A and receives the first video image 101 and the second video image 102 from the camera part 10 to extract the first motion object 2111 between the first video image 101 and the second video image 102 (S120).

Then, the fire detection method proceeds to a step in which the first video image 101 is set as the reference video image when a motion object is extracted by the object extraction part 20. The fire detection method proceeds to a step in which the third video image generated by the camera part 10 after the generation of the second video image is compared with the reference video image. Then, the fire detection method may proceed to a step in which the second motion object is extracted, and the second motion object matches with the reference objects A by being added and subtracted to or from the first motion object. The fire detection method proceeds to a step in which the first motion object is compared with the reference objects A, and the detection signal is generated when the first motion object matches with the reference objects by greater than or equal to the reference value, and the non-detection signal is generated when the first motion object matches with the reference objects by smaller than the reference value. The fire detection method proceeds to a step in which when the video image conversion part 30 receives the detection signal, the first video image 101 and the second video image 102 are enlarged around a location where the first motion object is detected, and to a step in which the enlarged first video image 101 and the enlarged second video image 102 are compared to each other and the same part between the first and second video images 101 and 102 is removed to generate the first background removal image 212 that has only a part where a difference exists (S131).

Further, the fire detection method proceeds to a step in which when the video image conversion part 30 receives the detection signal, the video image conversion part 30 compares the first video image 101 and the second video image 102 to generate the first background removal image 212, and to a step in which the video image conversion part 30 compares the first video image 101 and the third video image to generate the second background removal image. Then, the fire detection method proceeds to a step in which the first background removal image 212 and the second background removal image are compared to extract a part where a difference exists as the moving object image. At the same time, the fire detection method proceeds to a step in which the same color existing between the first video image and the second video image is removed to generate the first color extraction image, and the same color between the first video image and the third video image is removed to generate the second color extraction image. Then, the fire detection method proceeds to a step in which the image combination part 40 combines the moving object image with the first color extraction image 222 or the second color extraction image, and an overlap object is extracted from the combined image as a single area (S140). Then, the fire detection method proceeds to a step in which the image division part 50 divides the single area extracted by the image combination part 40 by the plurality of division lines 401 or divides the first background removal image 212 received from the video image conversion part 30 (S150). Then, the fire detection method proceeds to a step in which the image division part 50 moves the plurality of division lines to a motion objects obtained by adding various motion objects including the first motion object to calculate a size of the motion object (S160). Then, the fire detection method proceeds to a step in which the analyzing part 60 compares sizes of the first motion object and the motion object obtained by adding or subtracting another motion object to or from the first motion object with the preset size to primarily determine whether the abnormal signal is generated (S170).

Then, the fire detection method proceeds again to the step in which the video image conversion part 30 enlarges the first video image 101 and the second video image 102 around the location where the first motion object is detected, and to the step in which the enlarged first video image 101 and the enlarged second video image 102 are compared to each other and the same part therebetween is removed to generate the first background removal image 212 having only a part where a difference exists (S191). At the same time with S191, a step in which the same color between the first video image and the second video image is removed and the first color extraction image is generated proceeds (S192). Then, the fire detection method proceeds to a step in which the image combination part 40 combines the moving object image with the first color extraction image or the second color extraction image and then an overlap object is extracted into a single area from the combined image (S200). Then, the fire detection method proceeds to a step in which the image division part 50 divides the single area extracted by the image combination part 40 or divides the first background removal image 212 received from the video image conversion part 30 by the plurality of division lines 401 (S210). Then, the fire detection method proceeds to a step in which the image division part 50 moves the plurality of division lines to a motion object obtained by adding various motion objects including the first motion object to calculate a size of the motion object (S210). Then, the fire detection method proceeds to a step in which the analyzing part 60 compares sizes of the first motion object and the motion object obtained by adding and subtracting another motion object to or from the first motion object with the preset size to secondarily determine whether the abnormal signal is generated (S230). Then, the fire detection method may proceed to a step in which the generated abnormal signal is transmitted to generate an alarm (S240).

The fire detection method based on AI has from S110 to S230 as a series of steps, and may be ended by S230.

As described above, the fire detection method based on AI may have the high reliability in flame detection through the above-described steps. The fire detection method based on AI may check detected flame by various ways and analyze the size, temperature, and motion of flame to determine causes of flame. Moreover, the fire detection method based on AI may detect an object such as flame, human, etc., and enlarge the object to accurately detect a motion of the object and may accurately determine whether fire has occurred to detect a person who caused the fire.

Although preferred embodiments of the present disclosure has been described for illustrative purposes, those skilled in the art will appreciate that various modifications, additions and substitutions are possible, without departing from the scope and spirit of the present disclosure as disclosed in the accompanying claims. Therefore, the preferred embodiments described above have been described for illustrative purposes, and should not be construed as being restrictive.

What is claimed is:
1. A fire detection system based on artificial intelligence (AI), the fire detection system comprising:
a camera part monitoring a predetermined area and generating a first video image and a second video image according to monitoring time taken;
an object extraction part including a plurality of preset reference objects, receiving the first and second video images from the camera part to extract a first motion object between the first and second video images, and configured to compare the first motion object with the reference objects and to generate a detection signal when the first motion object is matched with the reference objects by greater than or equal to a reference value, and to generate a non-detection signal when the first motion object is matched with the reference objects by smaller than the reference value;

a video image conversion part receiving the first and second video images from the object extraction part, and when receiving the detection signal from the object extraction part, comparing the first video image and the second video image with each other and removing same parts therein to generate a first background removal image;

an image division part dividing the first background removal image with a plurality of division lines, moving the division lines to the first motion object, and calculating a size of the first motion object; and an analyzing part configured to generate an abnormal signal when the size of the first motion object is greater than or equal to a preset size and to generate a normal signal when the size of the first motion object is smaller than the preset size.

2. The fire detection system of claim 1, wherein the object extraction part sets the first video image as a reference video image when the first motion object is extracted, extracts a second motion object by comparing the reference video image with a third video image generated in the camera part after the second video image is generated, and adds and subtracts the second motion object to or from the first motion object to match the second motion object with the reference objects.

3. The fire detection system of claim 2, wherein the video image conversion part compares the first background removal image, which is generated by comparing the first video image and the second video image, and a second background removal image, which is generated by comparing the first video image and the third video image, to extract a part where a difference exists as a moving object image.

4. The fire detection system of claim 3, wherein the video image conversion part is configured to generate a first color extraction image by removing same color between the first video image and the second video image or to generate a second color extraction image by removing same color between the first video image and the third video image.

5. The fire detection system of claim 4, further comprising:

an image combination part configured to combine the moving object image with the first color extraction image or the second color extraction image to detect the first motion object or the second motion object, respectively.

6. The fire detection system of claim 1, wherein the analyzing part calculates a brightness value of a plurality of divided spaces and adds a plurality of spaces that have brightness values greater than or equal to a reference brightness value to be generated into a single space.

7. A fire detection method based on AI, the fire detection method comprising the steps of:

(A) monitoring a predetermined area and generating a first video image and a second video image according to monitoring time taken by a camera part;

(B) receiving, by an object extraction part having a plurality of preset reference objects, the first video image and the second video image from the camera part to extract a first motion object between the first video image and the second video image, and comparing the first motion object with the reference objects to generate a detection signal when the first motion object is matched with the reference objects by greater than or equal to a reference value, and to generate a non-detection signal when the first motion object is matched with the reference objects by less than the reference value;

(C) receiving, by a video image conversion part, the first video image and the second video image from the object extraction part, and comparing the first video image and the second video image and removing a same part therefrom to generate a first background removal image when the detection signal is transmitted from the object extraction part;

(D) dividing, by an image division part, the first background removal image with a plurality of division lines, moving the division lines to the first motion object, and calculating a size of the first motion object;

(E) generating an abnormal signal when the size of the first motion object is greater than or equal to a preset size, and generating a normal signal when the size of the first motion object is smaller than the preset size.

8. The fire detection method of claim 7, wherein the step (B) further comprises:

setting the first video image as a reference video image when the first motion object is extracted by the object extraction part, extracting a second motion object by comparing the reference video image with a third video image generated in the camera part after the second video image is generated, and adding and subtracting the second motion object to and from the first motion object to match the second motion object with the reference objects.

9. The fire detection method of claim 8, wherein the step (C) further comprises:

comparing, by the video image conversion part, the first background removal image, which is generated by comparing the first video image and the second video image, and a second background removal image, which is generated by comparing the first video image and the third video image, to extract a part where a difference exists as a moving object image.

10. The fire detection method of claim 8, wherein the step (C) further comprises:

generating, by the video image conversion part, a first color extraction image by removing same color between the first video image and the second video image and generating a second color extraction image by removing same color between the first video image and the third video image.

* * * * *